United States Patent
Park et al.

(10) Patent No.: US 9,938,142 B2
(45) Date of Patent: Apr. 10, 2018

(54) HYDROGEN STORAGE MATERIAL AND MANUFACTURING METHOD THEREOF

(71) Applicants: HYUNDAI MOTOR COMPANY, Seoul (KR); KOREA INSTITUTE OF SCIENCE AND TECHNOLOGY, Seoul (KR)

(72) Inventors: Sangback Park, Seoul (KR); Dong Hoon Nam, Suwon-si (KR); Hoon Mo Park, Seongnam-si (KR); Young Whan Cho, Seoul (KR); Young Su Lee, Seoul (KR)

(73) Assignees: HYUNDAI MOTOR COMPANY, Seoul (KR); KOREA INSTITUTE OF SCIENCE AND TECHNOLOGY, Seoul (KR)

(*) Notice: Subject to any disclaimer, the term of this patent is extended or adjusted under 35 U.S.C. 154(b) by 263 days.

(21) Appl. No.: 14/942,872

(22) Filed: Nov. 16, 2015

(65) Prior Publication Data
US 2017/0073225 A1   Mar. 16, 2017

(30) Foreign Application Priority Data
Sep. 16, 2015 (KR) .......................... 10-2015-0131211

(51) Int. Cl.
*C01B 3/00* (2006.01)
(52) U.S. Cl.
CPC ............ *C01B 3/0078* (2013.01); *C01B 3/001* (2013.01); *Y02E 60/324* (2013.01)

(58) Field of Classification Search
None
See application file for complete search history.

(56) References Cited

U.S. PATENT DOCUMENTS

| 2006/0127304 A1* | 6/2006 | Fujii ...................... B01J 20/04 423/644 |
| 2008/0226532 A1* | 9/2008 | Zak-Fang ............. C01B 3/0031 423/351 |
| 2008/0274033 A1* | 11/2008 | Meisner .................. C01B 3/065 423/413 |
| 2008/0286196 A1* | 11/2008 | Faheem .................. C01B 3/001 423/658.2 |

(Continued)

FOREIGN PATENT DOCUMENTS

| JP | 2007-076979 A | 3/2007 |
| JP | 2008-043927 A | 2/2008 |
| JP | 2009-007180 A | 1/2009 |

(Continued)

OTHER PUBLICATIONS

Extended European Search Report dated Aug. 19, 2016 issued in European Patent Application No. 15194186.1.

(Continued)

*Primary Examiner* — Joseph D Anthony
(74) *Attorney, Agent, or Firm* — McDermott Will & Emery LLP

(57) ABSTRACT

A hydrogen storage material includes $Mg(NH_2)_2$, LiH, and $MgH_2$. A manufacturing method of a hydrogen storage material includes steps of manufacturing a mixture by mixing $Mg(NH_2)_2$, LiH, and $MgH_2$, and pulverizing the mixture.

7 Claims, 4 Drawing Sheets

(56) References Cited

U.S. PATENT DOCUMENTS

2009/0121184 A1* 5/2009 Fujii ............... C01B 3/065
                                                  252/188.25
2014/0178291 A1* 6/2014 Bennington .......... C01B 3/0084
                                                  423/648.1

FOREIGN PATENT DOCUMENTS

| JP | 2011-020901 A | 2/2011 |
| JP | 2011-169350 A | 9/2011 |
| WO | 2008/057340 A2 | 5/2008 |

OTHER PUBLICATIONS

L. E. Klebanoff, et al., "5 Year of hydrogen storage research in the U.S. DOE Metal Hydride Center of Excellence (MHCoE)," International Journal of Hydrogen Energy, Elsevier Science Publishers B.V., Barking, GB, vol. 38, No. 11, Feb. 27, 2013, pp. 4533-4576.

Liang Chu, Ph.D., "Hydrogen Storage Properties and Mechanisms of Li—Mg—N—H-based Hydrogen Storage Materials with High C," Thesis, Zhejiang University Materials Science (2011).

Han Wang, et al, "The improved Hydrogen Storage Performances of the Multi-Component Composite: $2Mg(NH_2)_2$-$3LiH$-$LiBH_4$," Energies, 2015, vol. 8, pp. 6898-6909.

* cited by examiner

HYDROGEN STORAGE MATERIAL AND MANUFACTURING METHOD THEREOF

CROSS-REFERENCE TO RELATED APPLICATION

This application claims the benefit of priority to Korean Patent Application No. 10-2015-0131211, filed in the Korean Intellectual Property Office on Sep. 16, 2015, the entirety of which is incorporated herein by reference.

TECHNICAL FIELD

The present disclosure relates to a hydrogen storage material and a manufacturing method thereof.

BACKGROUND

Recently, environmental issues, such as global warming caused by increasing emissions of carbon dioxide and other greenhouse gases, and energy issues, such as the exhaustion of oil reserves, have been dramatically on the rise. As a result, hydrogen energy as an environmentally-friendly alternative energy source has attracted greater attention.

In order to allow for the practical use of hydrogen energy, various techniques for storage, transportation, and generation of hydrogen in a safe and efficient way have been actively developed.

Among a plurality of methods of hydrogen storage, a method for using a hydrogen storage material capable of reversibly storing and releasing hydrogen is highly desired in a storage medium for hydrogen to be applied to an electric vehicle.

Carbon materials such as activated carbon, fullerene, nanotubes, and hydrogen storage alloys such as $LaNi_5$ and TiFe are widely known as hydrogen storage materials.

Among these materials, a hydrogen storage alloy is widely and preferably used as a hydrogen storage material for storage and transportation of hydrogen, since the hydrogen storage alloy has a higher hydrogen density per unit volume than that of a carbon material.

However, hydrogen storage alloys such as $LaNi_5$ and TiFe include rare metals such as La, Ni, and Ti, which leads to problems associated with securing resources and a high cost.

Furthermore, conventional hydrogen storage alloys containing a considerably heavyweight alloy itself have an innate drawback, in that a significantly heavyweight alloy is required to store large quantities of hydrogen.

In order to overcome the above-mentioned problems, various techniques regarding hydrogen storage materials containing light elements have been developed.

The developed hydrogen storage materials which contain the light elements include: (1) a complex hydride containing lithium (Li) such as $LiNH_2$ and $LiBH_4$; (2) a complex hydride containing sodium (Na) such as $NaAlH_4$; and (3) a complex hydride containing magnesium (Mg) such as $Mg(NH_2)_2$.

The above information disclosed in this Background section is only to enhance the understanding of the background of the disclosure and therefore it may contain information that does not form the prior art that is already known in this country to a person of ordinary skill in the art.

SUMMARY

The present disclosure has been made in an effort to provide a hydrogen storage material and a manufacturing method thereof that have a decreased release (or discharge) temperature of hydrogen and improved reversible capacity.

An exemplary embodiment of the present inventive concept provides a hydrogen storage material including $Mg(NH_2)_2$, LiH, and $MgH_2$.

The hydrogen storage material may include $Mg(NH_2)_2$ at about 30 to 45 mol %, LiH at about 40 to 60 mol %, and $MgH_2$ at about 5 to 15 mol %.

The hydrogen storage material may further include a metal borohydride at about 1 to 10 mol represented by Chemical Formula 1 with respect to the total amount of 100 mol of $Mg(NH_2)_2$, LiH, and $MgH_2$.

$M(BH_4)_n$     [Chemical Formula 1]

In Chemical Formula 1, M includes one or more selected from the group consisting of Li, K, Mg, Ca, Sr, Ba, Y, La, and Ce, and n indicates an oxidation number of M.

In Chemical Formula 1, M may include one or more selected from the group consisting of Li and K, and n may indicate 1.

Another embodiment of the present inventive concept provides a manufacturing method of a hydrogen storage material, including steps of: manufacturing a mixture by mixing $Mg(NH_2)_2$, LiH, and $MgH_2$; and pulverizing the mixture.

The mixture may be manufactured by mixing $Mg(NH_2)_2$ at about 30 to 45 mol %, LiH at about 40 to 60 mol %, and $MgH_2$ at about 5 to 15 mol %.

The step of manufacturing the mixture may further include adding a metal borohydride at about 1 to 10 mol represented by Chemical Formula 1 with respect to the total amount of 100 mol of $Mg(NH_2)_2$, LiH, and $MgH_2$.

Formula $M(BH_4)_n$ The step of manufacturing the mixture by mixing $Mg(NH_2)_2$, LiH, and $MgH_2$ may include mixing $Li(NH_2)$ and $MgH_2$, and then heat-treating the mixed $Li(NH_2)$ and $MgH_2$ at a temperature of about 120 to 170° and a hydrogen pressure of about 50 to 200 atm.

According to an exemplary embodiment of the present inventive concept, an equilibrium temperature of hydrogen release (discharge) is decreased.

In addition, according to the exemplary embodiment of the present inventive concept, reversible capacity is improved.

DETAILED DESCRIPTION OF THE EMBODIMENTS

Figure 1:
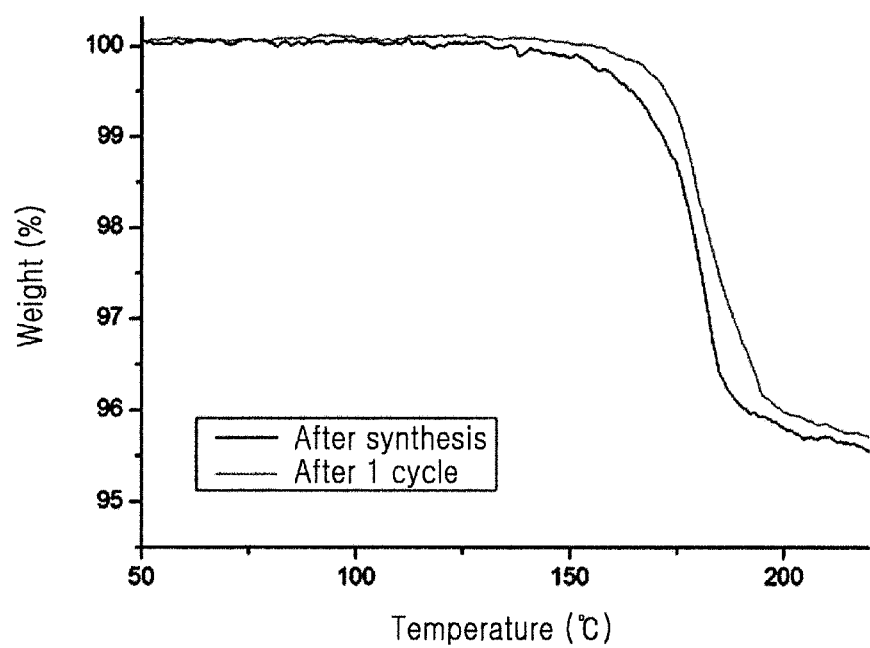
FIG. 1 illustrates an analysis result of thermogravimetric analysis (TGA) after the synthesis of a hydrogen storage material manufactured by Exemplary Embodiment 1 and one cycle are properly conducted.

The advantages and features of the present inventive concept and the methods for accomplishing the same will be apparent from the exemplary embodiments described hereinafter with reference to the accompanying drawings. However, the present inventive concept is not limited to the exemplary embodiments described hereinafter, but may be embodied in many different forms. The following exemplary embodiments are provided to make the disclosure of the present inventive concept complete and to allow those skilled in the art to clearly understand the scope of the present inventive concept, and the present inventive concept is defined only by the scope of the appended claims. Throughout the specification, the same reference numerals denote the same elements.

In some exemplary embodiments, detailed description of well-known technologies will be omitted to prevent the disclosure of the present inventive concept from being interpreted ambiguously. Unless otherwise defined, all terms (including technical and scientific terms) used herein have the same meaning as commonly understood by one of ordinary skill in the art. In addition, throughout the specification, unless explicitly described to the contrary, the word "comprise" and variations such as "comprises" or "comprising" will be understood to imply the inclusion of stated elements but not the exclusion of any other elements. Further, as used herein, the singular forms "a", "an", and "the" are intended to include the plural forms as well, unless the context clearly indicates otherwise.

A hydrogen storage material according to an exemplary embodiment of the present inventive concept includes $Mg(NH_2)_2$, LiH, and $MgH_2$.

In an exemplary embodiment of the present inventive concept, the hydrogen storage material includes LiH and $MgH_2$, thereby decreasing the equilibrium temperature of hydrogen release and increasing reversible capacity.

For example, when only LiH is added without adding $MgH_2$, a reversible endothermic chemical reaction occurs as in Chemical Equation 1.

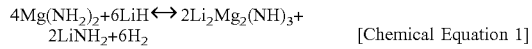   [Chemical Equation 1]

In this case, the reversible capacity is approximately 4.43 wt % and the equilibrium temperature of the hydrogen release reaches approximately 100° C.

Alternatively, in the exemplary embodiment of the present inventive concept, when both LiH and $MgH_2$ are included in the hydrogen storage material, Chemical Equation 2 proceeds simultaneously with Chemical Equation 1 due to the addition of $MgH_2$.

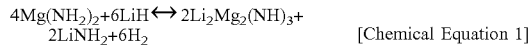   [Chemical Equation 1]

   [Chemical Equation 2]

Therefore, Chemical Equation (3) is finally represented by combining both Chemical Equations (1) and (2).

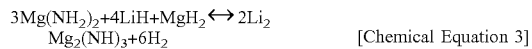   [Chemical Equation 3]

Since Chemical Equation 2 described above represents an exothermic reaction, the equilibrium temperature of the hydrogen release of Chemical Equation 3 is lower than that of Chemical Equation 1.

Further, while an amide containing a high hydrogen content exists as a final product in Chemical Equation 1, all of the contents exist as the form of an imide in Chemical Equation 3. As a result, the reversible capacity of Chemical Equation 3 is higher than that of Chemical Equation 1.

Each component will be now described in detail.

[$Mg(NH_2)_2$]

$Mg(NH_2)_2$ may be included from about 35 to 45 mol % with respect to 100 mol % of the hydrogen storage material.

When the added amount of $Mg(NH_2)_2$ is too small, hydrogen release capacity may deteriorate.

When the added amount of $Mg(NH_2)_2$ is too large, the hydrogen release temperature may increase, and side products such as $NH_3$ may be generated.

Accordingly, the added amount of $Mg(NH_2)_2$ may be properly controlled in the above-mentioned range.

[LiH]

The hydrogen included in $Mg(NH_2)_2$ is released by reacting with $MgH_2$ and LiH.

LiH may be included from about 40 to 60 mol % with respect to 100 mol % of the hydrogen storage material.

When the added amount of LiH is too small, the hydrogen included in $Mg(NH_2)_2$ may not be completely released, thus some hydrogen may remain.

When the added amount of LiH is too large, hydrogen storage capacity may deteriorate.

Accordingly, the added amount of LiH may be properly controlled in the above-mentioned range.

[$MgH_2$]

The hydrogen included in $Mg(NH_2)_2$ is released by reacting with $MgH_2$ and LiH.

$MgH_2$ may be included from about 5 to 15 mol % with respect to 100 mol % of the hydrogen storage material.

When the added amount of $MgH_2$ is too small, the exothermic reaction of Chemical Equation 2 may not properly occur, and thus the equilibrium temperature of the hydrogen release may not drop.

When the added amount of $MgH_2$ is too large, the reaction represented by Chemical Equation 4 is induced, and thus reversible capacity may deteriorate.

As a result, the added amount of $MgH_2$ may be properly controlled in the above-mentioned range.

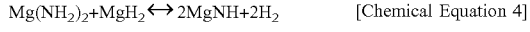   [Chemical Equation 4]

[Metal Borohydride]

A hydrogen storage material according to an exemplary embodiment of the present inventive concept may further include a metal borohydride described in the following Chemical Formula 1.

The metal borohydride serves to accelerate the above-mentioned Chemical Equations 1 to 3.

   [Chemical Formula 1]

In Chemical Formula 1, M includes one or more kinds of Li, K, Mg, Ca, Sr, Ba, Y, La, and Ce, and n indicates an oxidation number of M.

When M is two or more in Chemical Formula 1, it means that two or more kinds of the metal borohydride are included in the hydrogen storage material.

For example, when the M is K and Li, it means that both $KBH_4$ and $LiBH_4$ are included in the hydrogen storage material.

In Chemical Formula 1, n indicates the oxidation number of M.

For example, when M is Li, n is 1.

The metal borohydride at about 1 to 10 mol with respect to the total amount 100 mol of the $Mg(NH_2)_2$, LiH, and $MgH_2$ may be further added.

When the added amount of the metal borohydride is too small, the improvement effect of the reaction rate may be insignificant.

When the added amount of metal borohydride is too large, hydrogen storage capacity may deteriorate.

Therefore, the added amount of the metal borohydride may be properly controlled in the above-mentioned range.

A manufacturing method of a hydrogen storage material according to an exemplary embodiment of the present inventive concept includes manufacturing a mixture by mixing $Mg(NH_2)_2$, LiH, and $MgH_2$ (S10), and pulverizing the mixture (S20).

First, the mixture is manufactured by mixing $Mg(NH_2)_2$, LiH, and $MgH_2$ at step S10.

A description with respect to each component of the mixture is the same as the above-mentioned description, so a description thereof will be omitted.

Step S10 may include mixing $Li(NH_2)$ and $MgH_2$, and heat-treating the mixture at a temperature of about 120 to 170° C. and a hydrogen pressure of about 50 to 200 atm.

$Mg(NH_2)_2$ and LiH may be prepared through step S10.

Next, the mixture is pulverized at step S20.

The hydrogen storage capacity may be enhanced by pulverizing the mixture.

Hereinafter, the present inventive concept will be described in detail on the basis of exemplary embodiments.

However, the following exemplary embodiments are only examples of the present inventive concept, and the present inventive concept is not limited to the exemplary embodiments.

Exemplary Embodiment 1

Heat-treatment was conducted at a temperature of about 150° C. and a hydrogen partial pressure of about 100 atm after $Li(NH_2)$ at about 0.81 g and $MgH_2$ at about 0.46 g, and metal borohydrides such as $LiBH_4$ at about 0.038 g and $KBH_4$ at about 0.036 g, were properly mixed.

$MgH_2$ at about 0.15 g was additionally mixed into the mixture described above after $Mg(NH_2)_2$ and LiH generated from the starting materials was confirmed.

FIG. 1 illustrates the analysis result by a thermogravimetric analysis (TGA) after the synthesis of a hydrogen storage material manufactured by Exemplary Embodiment 1 and one cycle are properly conducted.

In this case, one cycle conducted the release and absorption of hydrogen at a temperature of about 170° C.

As shown in FIG. 1, it can be seen that since the hydrogen storage capacity is similar after the synthesis and the one cycle are properly conducted, the hydrogen storage material manufactured by Exemplary Embodiment 1 is reversible.

Figure 2:
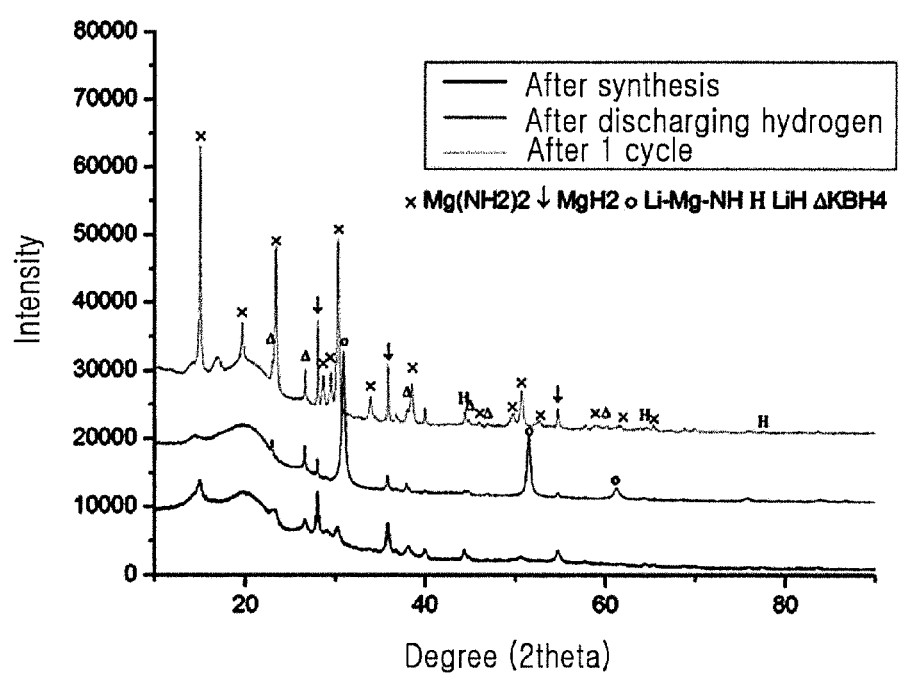
FIG. 2 illustrates an analysis result by an X-ray diffraction (XRD) analysis after the synthesis of the hydrogen storage material manufactured by Exemplary Embodiment 1, hydrogen release, and one cycle are properly conducted.

In addition, FIG. 2 illustrates the analysis result of X-ray diffraction (XRD) after the synthesis of the hydrogen storage material manufactured by Exemplary Embodiment 1, hydrogen release, and one cycle are properly conducted.

As shown in FIG. 2, it can be seen that since the starting materials such as $Mg(NH_2)_2$, LiH, and $MgH_2$ are apparently formed after the hydrogen release and the one cycle are properly conducted, the hydrogen storage material manufactured by Exemplary Embodiment 1 is reversible.

Comparative Example 1

In Comparative Example 1, a hydrogen storage material that is the same as in Exemplary Embodiment 1 was manufactured, except that $MgH_2$ was not added.

Figure 3:
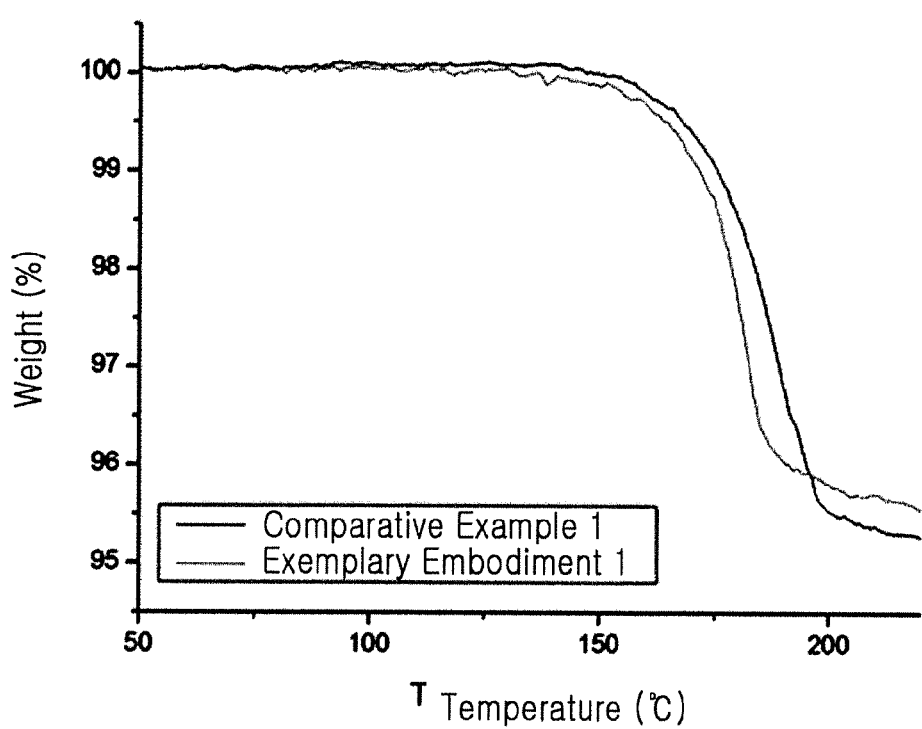
FIG. 3 illustrates an analysis result of thermogravimetric analysis (TGA) after the synthesis of hydrogen storage materials respectively manufactured by Exemplary Embodiment 1 and Comparative Example 1 is properly conducted.

FIG. 3 illustrates the analysis result of thermogravimetric analysis (TGA) after the synthesis of hydrogen storage materials respectively manufactured by Exemplary Embodiment 1 and Comparative Example 1 is properly conducted.

As shown in FIG. 3, it can be seen that the weight of the hydrogen storage material manufactured by Exemplary Embodiment 1 is reduced at a lower temperature.

In the thermogravimetric analysis (TGA), because the weight loss represents hydrogen release, it can be seen that the hydrogen storage material manufactured by Exemplary Embodiment 1 released hydrogen at a lower temperature.

Figure 4:
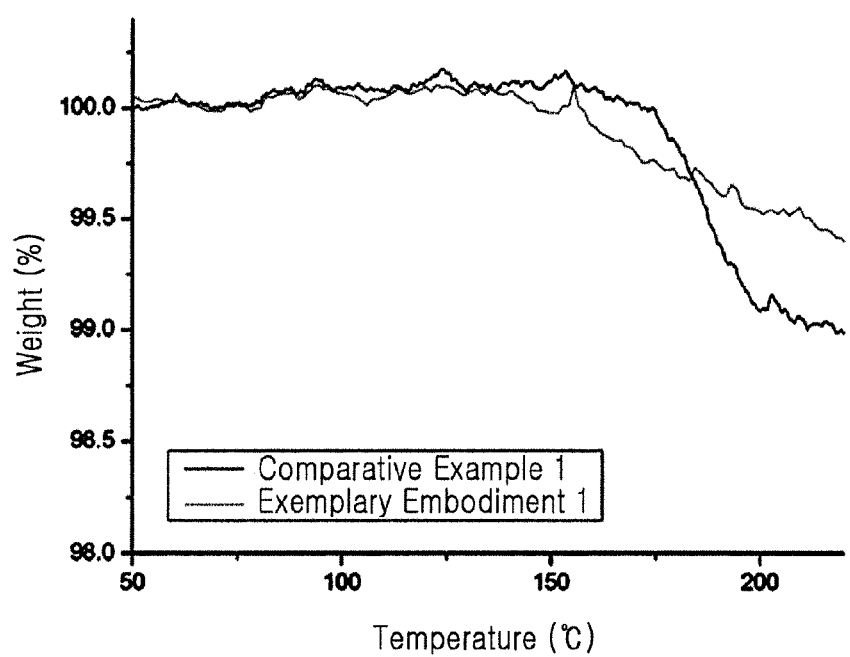
FIG. 4 illustrates an analysis result by the thermogravimetric analysis (TGA) after hydrogen is released from the hydrogen storage materials respectively manufactured by Exemplary Embodiment 1 and Comparative Example 1.

FIG. 4 illustrates the analysis result by the thermogravimetric analysis (TGA) after the hydrogen storage materials respectively manufactured by Exemplary Embodiment 1 and Comparative Example 1 release hydrogen.

In this case, the hydrogen release was conducted at a temperature of about 170° C. for about 2 h.

As shown in FIG. 4, it can be seen that the amount of residual hydrogen of the hydrogen storage material manufactured by Exemplary Embodiment 1 is reduced, and this indicates that the hydrogen storage material manufactured by Exemplary Embodiment 1 has a fast chemical reaction.

The present inventive concept may be embodied in many different forms, and should not be construed as being limited to the disclosed embodiments. In addition, it will be understood by those skilled in the art that various changes in form and details may be made thereto without departing from the technical spirit and essential features of the present inventive concept. Therefore, it is to be understood that the above-described exemplary embodiments are for illustrative purposes only and the scope of the present inventive concept is not limited thereto.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A hydrogen storage material, comprising:
   $Mg(NH_2)_2$, LiH, and $MgH_2$,
   wherein the hydrogen storage material comprises $Mg(NH_2)_2$ at about 30 to 45 mol %, LiH at about 40 to 60 mol %, and $MgH_2$ at about 5 to 15 mol %.

2. The hydrogen storage material of claim 1, wherein the hydrogen storage material further comprises a metal borohydride at about 1 to 10 mol represented by Chemical Formula 1 with respect to the total amount of 100 mol of $Mg(NH_2)_2$, LiH, and $MgH_2$:

$$M(BH_4)_n \qquad \text{[Chemical Formula 1]}$$

where M includes one or more selected from the group consisting of Li, K, Mg, Ca, Sr, Ba, Y, La, and Ce, and n indicates an oxidation number of M.

3. The hydrogen storage material of claim 2,
   wherein M includes one or more selected from the group consisting of Li and K, and n indicates 1.

4. A manufacturing method of a hydrogen storage material, comprising steps of:
   manufacturing a mixture by mixing $Mg(NH_2)_2$, LiH, and $MgH_2$; and
   pulverizing the mixture,
   wherein the step of manufacturing the mixture includes mixing $Mg(NH_2)_2$ at about 30 to 45 mol %, LiH at about 40 to 60 mol %, and $MgH_2$ at about 5 to 15 mol %.

5. The manufacturing method of the hydrogen storage material of claim 4, wherein the step of manufacturing the mixture further includes adding a metal borohydride represented by Chemical Equation 1 at about 1 to 10 mol with respect to the total amount of 100 mol of $Mg(NH_2)_2$, LiH, and $MgH_2$:

$$M(BH_4)_n \qquad \text{[Chemical Formula 1]}$$

where M includes one or more selected from the group consisting of Li, K, Mg, Ca, Sr, Ba, Y, La, and Ce, and n indicates an oxidation number of M.

6. The manufacturing method of the hydrogen storage material of claim 5, wherein M includes one or more selected from the group consisting of Li and K, and n indicates 1.

7. The manufacturing method of the hydrogen storage material of claim 4, wherein the step of manufacturing the mixture by mixing $Mg(NH_2)_2$, LiH, and $MgH_2$ includes mixing $Li(NH_2)$ and $MgH_2$, and then heat-treating the mixed $Li(NH_2)$ and $MgH_2$ at a temperature of about 120 to 170° C. and a hydrogen pressure of about 50 to 200 atm.

* * * * *